(12) United States Patent
Harbourt et al.

(10) Patent No.: US 7,126,236 B2
(45) Date of Patent: Oct. 24, 2006

(54) METHODS AND APPARATUS FOR PITCH CONTROL POWER CONVERSION

(75) Inventors: Cyrus David Harbourt, Roanoke, VA (US); Jeffrey Alan Melius, Roanoke, VA (US); Amy Marlene Ridenour, Salem, VA (US); David Gerard Wanner, Jr., Roanoke, VA (US); Howard Ross Edmunds, Roanoke, VA (US); Andrew Scott Wilkinson, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/080,017

(22) Filed: Mar. 15, 2005

(65) Prior Publication Data

US 2006/0208493 A1    Sep. 21, 2006

(51) Int. Cl.
    *H02P 7/00*    (2006.01)
(52) U.S. Cl. .............................. 290/44; 290/55; 322/37
(58) Field of Classification Search .................. 290/44, 290/55; 322/37, 22, 29
    See application file for complete search history.

(56) References Cited

U.S. PATENT DOCUMENTS

| 4,193,005 A | 3/1980 | Kos et al. | |
|---|---|---|---|
| 5,083,039 A | 1/1992 | Richardson et al. | |
| 5,225,712 A * | 7/1993 | Erdman | 290/44 |
| 5,907,192 A * | 5/1999 | Lyons et al. | 290/44 |
| 6,381,158 B1 | 4/2002 | Harbourt et al. | |
| 6,420,795 B1 | 7/2002 | Mikhail et al. | |
| 6,566,764 B1 | 5/2003 | Rebsdorf et al. | |
| 6,856,038 B1 * | 2/2005 | Rebsdorf et al. | 290/44 |
| 6,856,040 B1 * | 2/2005 | Feddersen et al. | 290/44 |
| 6,891,281 B1 * | 5/2005 | Wobben | 290/44 |
| 7,012,409 B1 * | 3/2006 | Schreiber et al. | 323/207 |
| 7,015,595 B1 * | 3/2006 | Feddersen et al. | 290/44 |
| 7,042,110 B1 * | 5/2006 | Mikhail et al. | 290/44 |
| 2004/0145188 A1 | 7/2004 | Janssen et al. | |
| 2004/0222642 A1 | 11/2004 | Siebenthaler et al. | |

FOREIGN PATENT DOCUMENTS

| JP | 60240882 | 11/1985 |
|---|---|---|
| WO | WO 01/91279 A1 | 11/2001 |
| WO | WO 2005/017350 A1 | 2/2005 |

OTHER PUBLICATIONS

European Search Report; 5 pages; Jun. 12, 2006.

* cited by examiner

*Primary Examiner*—Nicholas Ponomarenko
(74) *Attorney, Agent, or Firm*—James E. McGinness; Armstrong Teasdale LLP

(57) ABSTRACT

A method for powering a pitch motor drive system for at least one DC pitch motor of a wind turbine includes rectifying a voltage using a bridge circuit to thereby supply a DC link voltage to a bridge comprising active switching devices, and utilizing at least one link capacitor to smooth the DC link voltage and act as an energy sink and source for the DC pitch motor or motors.

20 Claims, 8 Drawing Sheets

US 7,126,236 B2

METHODS AND APPARATUS FOR PITCH CONTROL POWER CONVERSION

BACKGROUND OF THE INVENTION

This invention relates generally to control of DC motors, and more particularly to methods and apparatus that are particularly useful for efficiently controlling DC pitch motors in wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox or directly coupled to the rotor. The gearbox, when present, steps up the inherently low rotational speed of the turbine rotor for the generator to efficiently convert mechanical energy to electrical energy, which is fed into a utility grid.

On a pitch controlled wind turbine, an electronic controller is used in conjunction with a blade pitch mechanism to pitch the blades around their respective longitudinal axes to control the power output of the wind turbine. Motors are provided to pitch the blades while the rotor is turning.

Some new pitch implementation systems are required to regenerate continuously. For example, the use of pitch control drive systems in wind turbines with one or more DC links as an intermediate link between source and load requires that the DC link(s) absorb regenerative energy under some conditions. For example, DC link(s) supplied by a diode source may be required to absorb regenerative energy when pitch drive motors are decelerating. The requirement to absorb regenerative energy continuously is new and is not believed to have been addressed by previously known wind turbine pitch system configurations.

BRIEF DESCRIPTION OF THE INVENTION

In one aspect, some configurations of the present invention therefore provide a method for powering a pitch motor drive system for at least one DC pitch motor of a wind turbine. The method includes rectifying a voltage using a bridge circuit to thereby supply a DC link voltage to a bridge comprising active switching devices, and utilizing at least one link capacitor to smooth the DC link voltage and act as an energy sink and source for the DC pitch motor or motors.

In another aspect, some configurations of the present invention provide a system for supplying power to at least one DC pitch motor of a wind turbine. The system includes a bridge circuit coupled to a source of power and configured to produce a rectified DC link voltage, a bridge of active switching devices configured to switch the DC link voltage and supply the switched DC link voltage to the DC pitch motor or motors, and at least one link capacitor in circuit and configured to smooth the DC link voltage and act as an energy sink and source for the DC pitch motor or motors.

In yet another aspect, some configurations of the present invention provide a wind turbine having a rotor, which itself has at least one blade operatively coupled to at least one DC pitch motor. Also provided is a power system including a bridge circuit operatively coupled to a source of power and configured to produce a rectified DC link voltage, a bridge of active switching devices configured to switch the DC link voltage and supply the switched DC link voltage to the DC pitch motor or motors, and at least one link capacitor in circuit and configured to smooth the DC link voltage and act as an energy sink and source.

It will thus be apparent that various configurations of the present invention realize advantages in system cost, reliability and/or availability, particularly when used in wind turbine pitch control systems. In addition, some configurations of the present invention used in wind turbine pitch control systems can be configured to advantageously provide energy swapping between pitch motor drive systems on a single DC bus and/or provide other ways to dissipate regenerative energy in single pitch motor drive systems and/or advantageously allow energy swapping between pitch control power converters. Energy swapping during operation poses advantages over single converter operation by allowing a reduction or minimization of the number and rating of dynamic brake (DB) resistors and DC link capacitors.

DETAILED DESCRIPTION OF THE INVENTION

Figure 1:
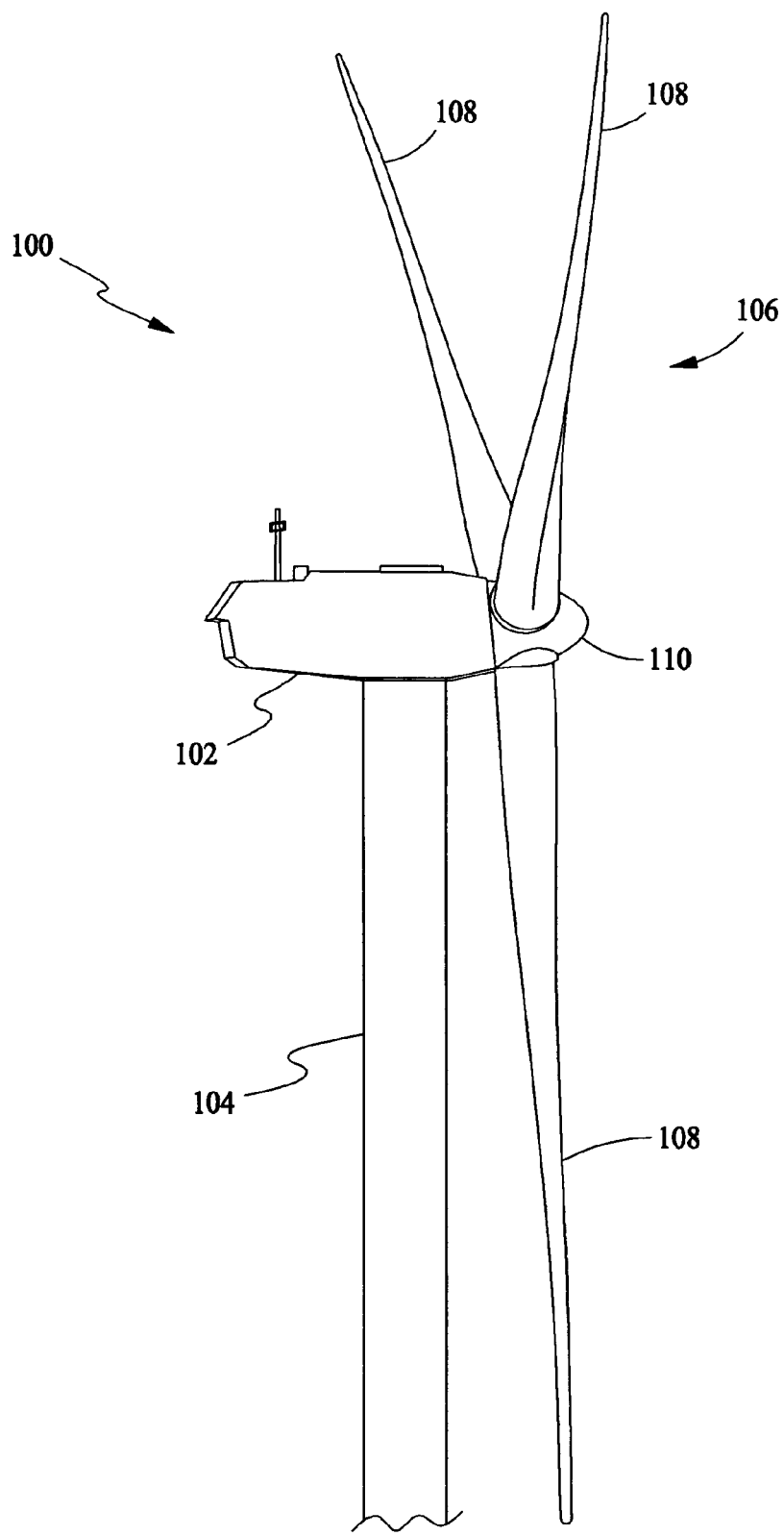
FIG. 1 is a drawing of an exemplary configuration of a wind turbine.

In some configurations and referring to FIG. 1, a wind turbine 100 in some configurations comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the present invention.

Figure 2:
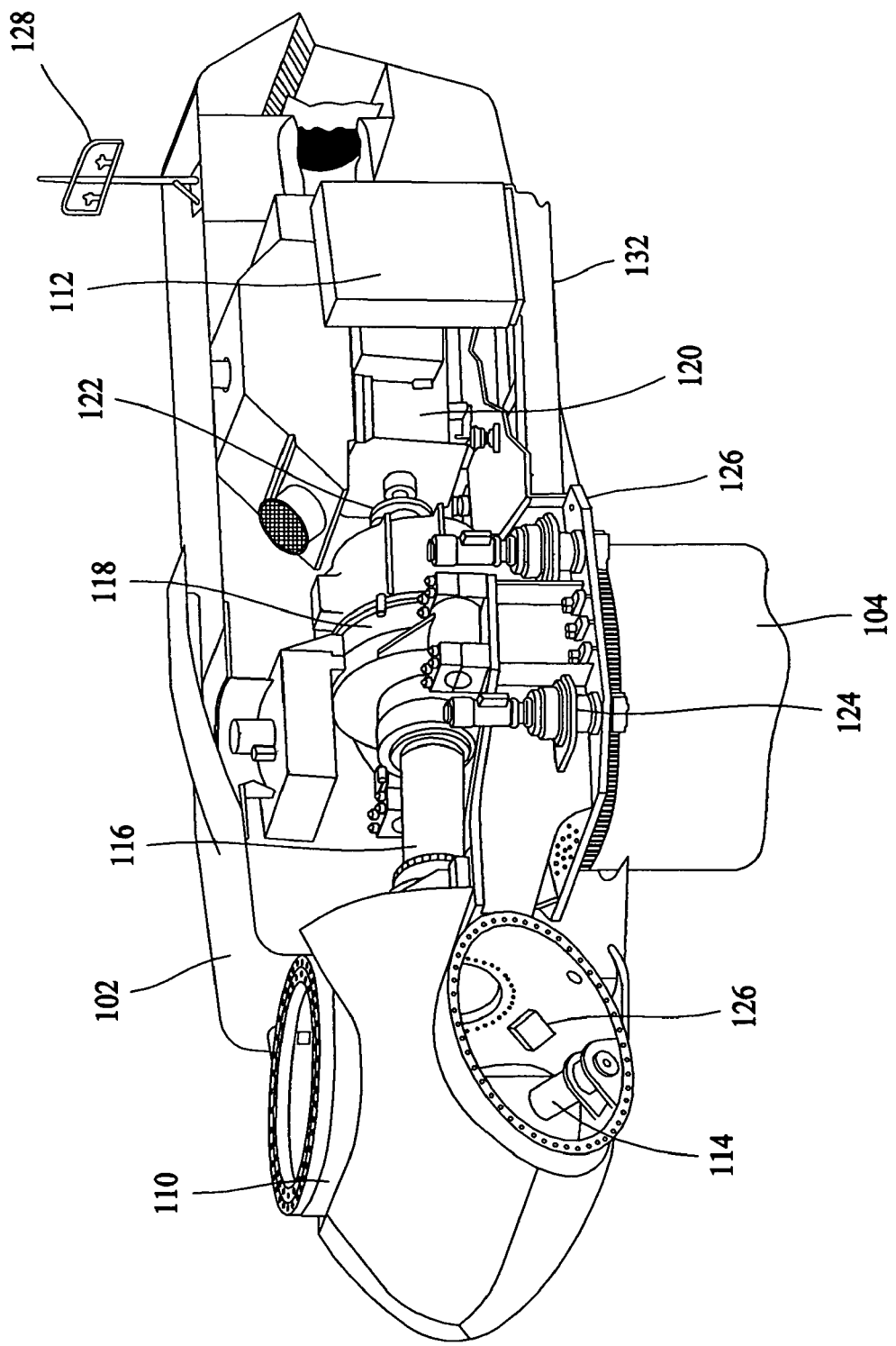
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 (which includes a DC pitch drive motor, not shown in FIG. 2) to control the pitch of blades 108 (also not shown in FIG. 2) that drive hub 110 as a result of wind. In some configurations, hub 110 receives three blades 108, but other configurations can utilize any number of blades. In some configurations, the pitches of blades 108 are individually controller by blade pitch drive 114. Hub 110 and blades 108 together comprise wind turbine rotor 106.

The drive train of the wind turbine includes a main rotor shaft 116 (also referred to as a "low speed shaft") connected to hub 110 and a gear box 118 that, in some configurations, utilizes a dual path geometry to drive a high speed shaft enclosed within gear box 118. The high speed shaft (not shown in FIG. 2) is used to drive a first generator 120 that is supported by main frame 132. In some configurations, rotor torque is transmitted via coupling 122. First generator 120 may be of any suitable type, for example and without limitation, a wound rotor induction generator. Another suitable type by way of non-limiting example is a multi-pole generator that can run at the speed of the low speed shaft in a direct drive configuration, without requiring a gearbox.

Yaw drive 124 and yaw deck 126 provide a yaw orientation system for wind turbine 100. In some configurations, the yaw orientation system is electrically operated and controlled by the control system in accordance with information received from sensors used to measure shaft flange displacement, as described below. Either alternately or in addition to the flange displacement measuring sensors, some configurations utilize a wind vane 128 to provide information for the yaw orientation system. The yaw system is mounted on a flange provided atop tower 104.

Figure 3:
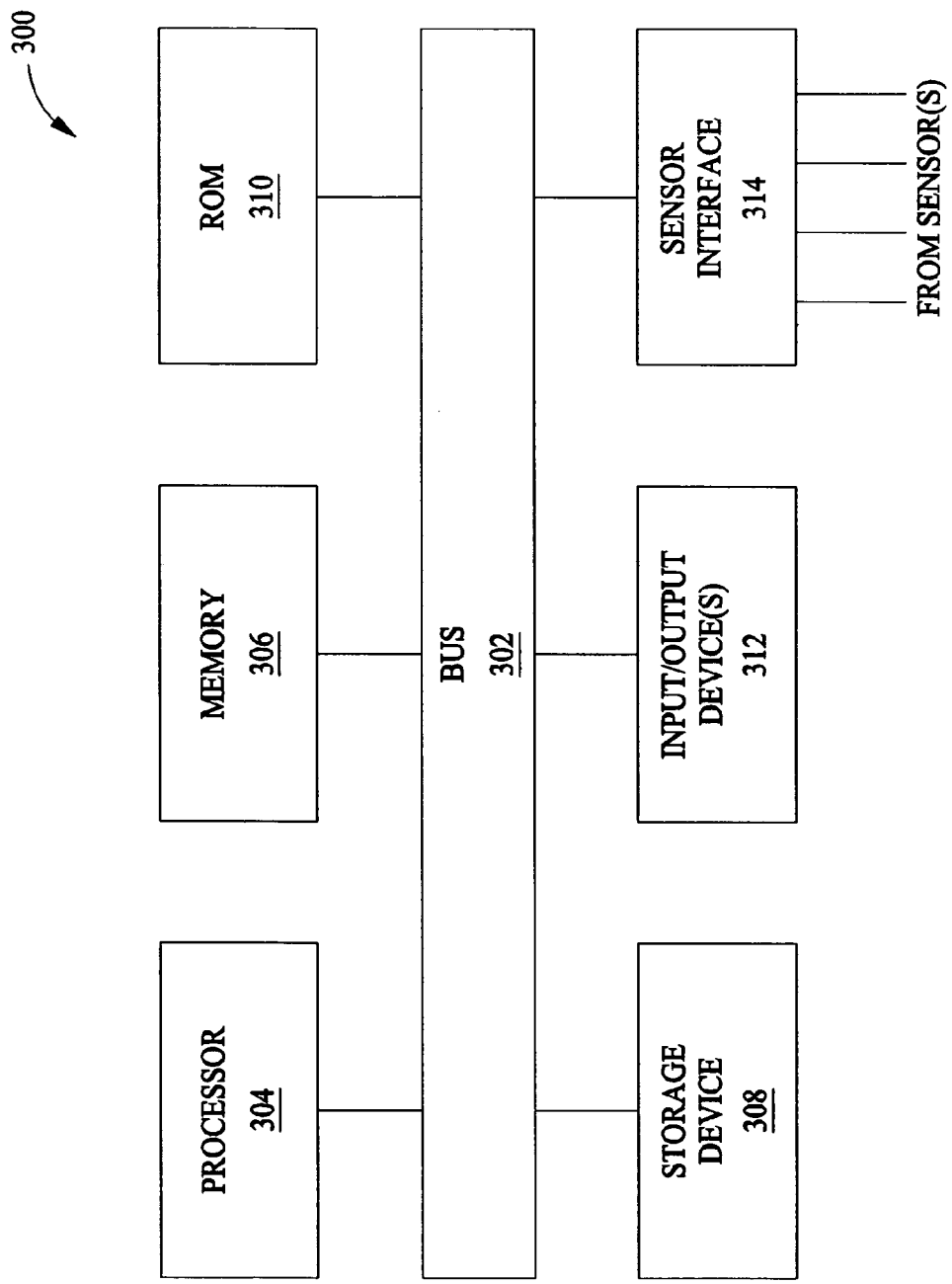
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
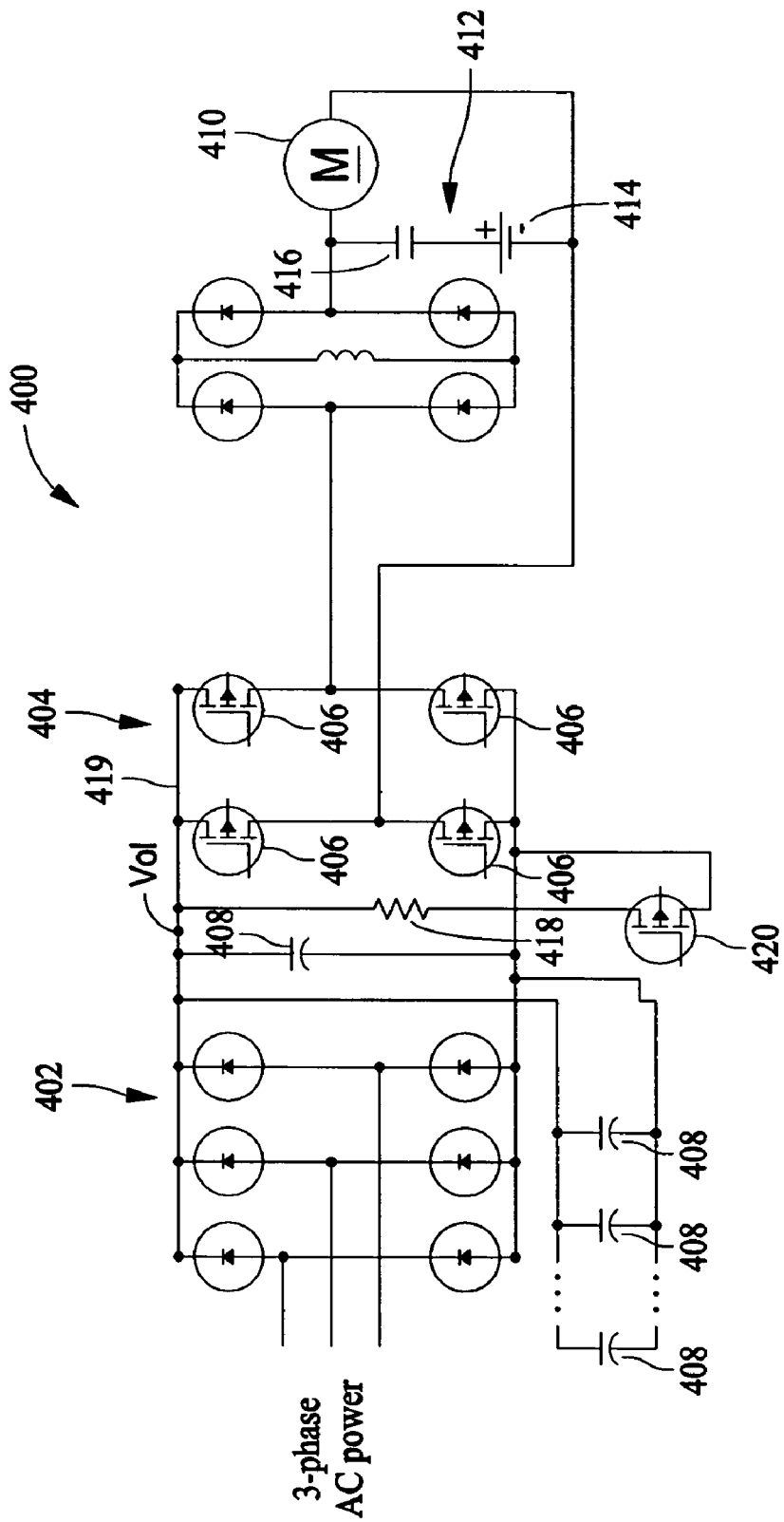
FIG. 4 is a block schematic diagram representative of some pitch control power conversion system configurations of the present invention.

In some configurations of the present invention and referring to FIG. 4, a single pitch motor drive system 400 is powered from a power source (not shown) using a transformer (also not shown) operatively coupled to a non regenerative diode bridge 402 that rectifies a voltage at the secondary of the transformer and that supplies a DC link voltage to an H-bridge 404 comprising four active switching devices 406, for example, paralleled MOSFETs or individual or paralleled IGBTs. At least one DC link capacitor 408 smooths DC link voltage $V_{DL}$ and act as an energy sink and source for a series DC motor 410, which operates variable blade pitch drive 114 (which itself is shown in FIG. 2). An emergency pitch system 412 comprising at least one battery 414 and contactors 416 is also provided in some configurations to pitch blades of the wind turbine (not shown in FIG. 1) to a feathered position when DC power is not otherwise available.

System 400 of FIG. 4 has some capability to absorb regenerative energy from series DC motor 410. Thus, single pitch motor drive system 400 is sufficient for applications that require blades 108 to be pitched to a desired angle and that then perform very small adjustments to the pitch angle while wind turbine 100 is operating.

In some configurations of wind turbine 100, a pitch controller could require blade position(s) to change significantly during every revolution of hub 110, and therefore require pitch motor drive system 400 to dissipate regenerative energy continuously. Thus, some (but not necessarily all) configurations of pitch motor drive system 400 are further provided with at least one dynamic brake (DB) resistor(s) 418 that are used to dissipate regenerative energy from motor 410. Dynamic brake resistor(s) 418 are electrically coupled to the DC link 419 through a power switch 420 (MOSFET or IGBT) when the DC link voltage $V_{DL}$ increases to a predefined limit. This approach has been used in some LV and MV induction motor drives by General Electric in the past.

Some configurations of pitch control systems for wind turbines have unique environmental requirements that make dissipation of regenerative energy in dynamic braking resistors a disadvantage. Thus, some (but not necessarily all) configuration of pitch motor drive system 400 are also provide with additional capacitors 408 added to DC link 419 to advantageously allow the link voltage $V_{DL}$ to stay within predefined limits without excessive power dissipation and attendant heating of the environment near pitch motor drive system 400.

In some configurations of wind turbines 100, plural pitch motor drive systems 400 are used to pitch different blades 108. Each pitch motor drive system 400 is decoupled from the others by input transformers (not shown in the Figures), which isolate each diode-based source bridge 422 from three phase grid AC power 424.

Figure 5:
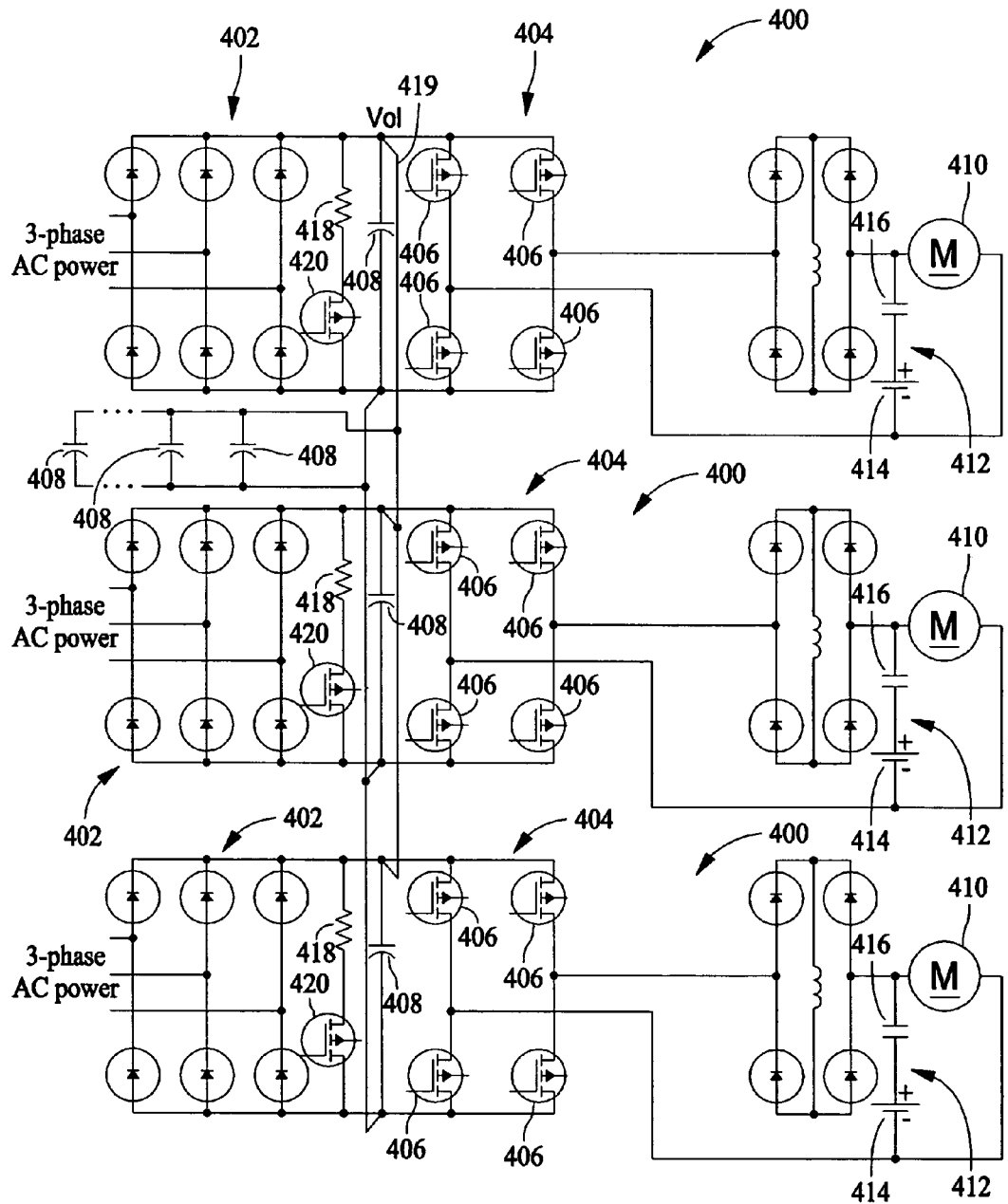
FIG. 5 is a block schematic diagram representative of some pitch control power conversion system configurations of the present invention in wind turbines having a plurality of pitch motors and pitch motor drive systems.

In some configurations and referring to FIG. 5, extra heat in wind turbine hub 110 produced by dynamic brake resistors 418 and increased parts count resulting from plural DC link capacitors 408 and/or dynamic brake resistors are avoided. More particularly, a common DC link 419 and DC link voltage $V_{DL}$ are shared between a plurality of pitch motors 410 and drive systems 400. For example, three such systems 400 share a common DC link 419 in the configuration represented in FIG. 5. Common DC link 419 allows energy swapping between systems 400.

In some configurations of the present invention represented by FIG. 5, a plurality of pitch drive systems 400 are interconnected with a common DC link 419, and individual DB resistors 418 are provided for each of the plurality of pitch motor drive systems 400. The interconnection provided by DC link 419 permits DB resistors 418 to have a lower power dissipation rating than would otherwise be necessary. Some configurations provide plural DC link capacitors 408. In such configurations, energy swapping between the plural pitch motor drive systems 400 allows for a reduction in the total capacitance on common DC link 419 and reduces the rating required for DB resistors 418.

Figure 6:
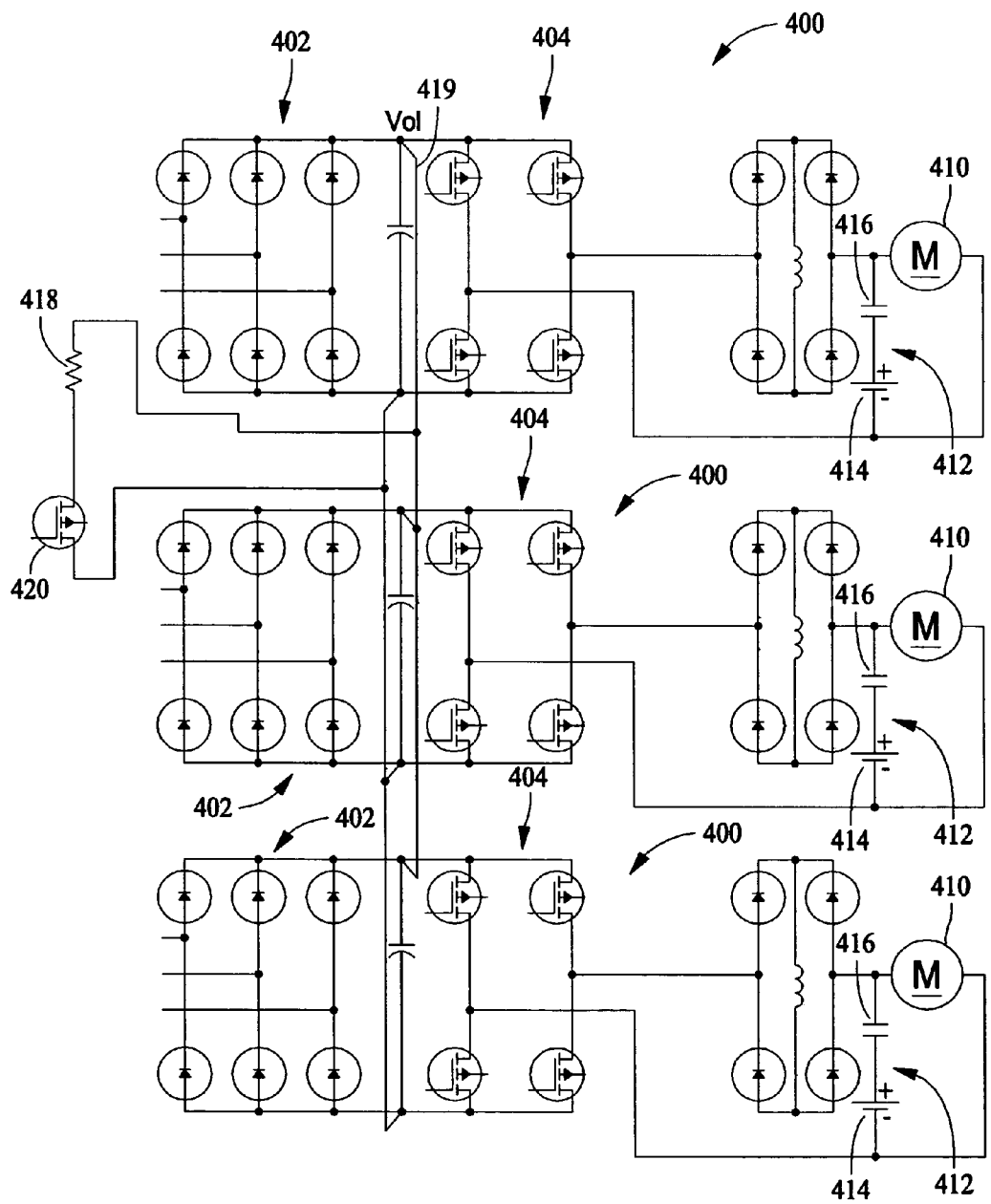
FIG. 6 is a block schematic diagram representative of some pitch control power conversion system configurations of the present invention in wind turbines having a plurality of pitch motors and pitch motor drive systems and having a common dynamic brake resistor.

In some configurations of the present invention and referring to FIG. 6, a common DB resistor 418 is provided. Some configurations also provide a common power switch 420 used to control the magnitude of current through DB resistor 418.

Figure 7:
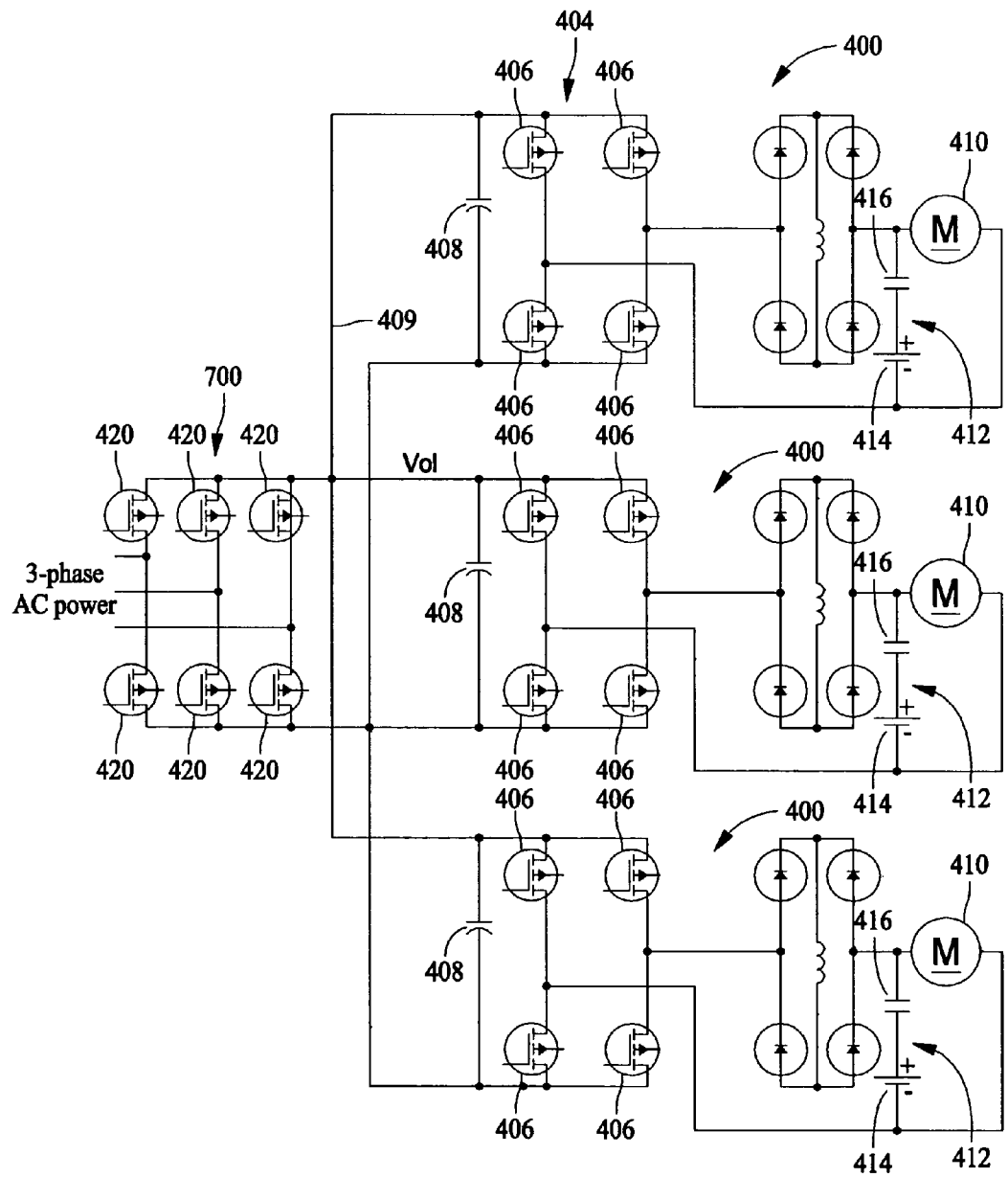
FIG. 7 is a block schematic diagram representative of some pitch control power conversion system configurations of the present invention in wind turbines having a plurality of pitch motors and pitch motor drive systems and in which a set of input power switches replace a non regenerative diode bridge.

In some configurations of the present invention and referring to FIG. 7, the need to add DB resistors 418 or a plurality of DC link capacitors 408 can be avoided by adding a regenerative source for the DC link voltage $V_{DL}$. For example, the example configuration represented in FIG. 7 is configured to absorb all regenerative energy not circulated between the pitch motor drive systems 400 using a set 700 of input power switches 420 that replaces non regenerative diode bridge 402. Thus, the DC link voltage $V_{DL}$ that is applied to all pitch motor drives systems 400 is regulated.

Figure 8:
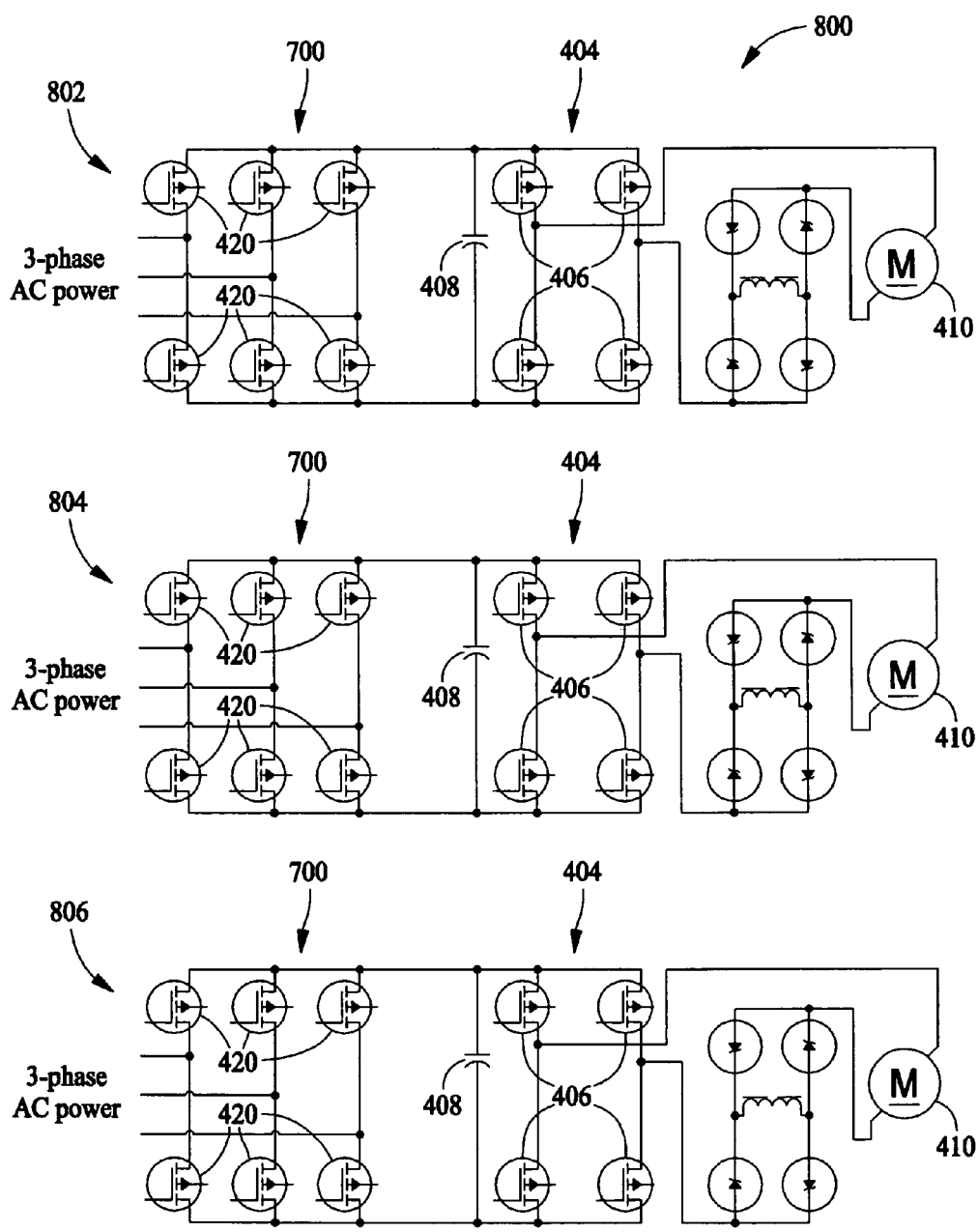
FIG. 8 is a block schematic diagram representative of some pitch control power conversion system configurations of the present invention similar to those of FIG. 7, but with an individual regenerative MOSFET source provided for each pitch drive.

In some configurations and referring to FIG. 8, a circuit 800 a separate regenerative MOSFET source bridge 700 using MOSFETs 420 is provided for each pitch drive. IGBT devices can be used in place of MOSFETs 420 if more rating is desired. The circuit illustrated in FIG. 7 differs from that of FIG. 8 in that the circuit of FIG. 7 is generally more cost-effective and uses a single regenerative source configured to absorb all or most of the regenerative energy not circulated between the pitch motor drive systems. In circuit 800 of FIG. 8, separate branches 802, 804, 806 are provided for axis 1 pitch control, axis 2 pitch control, and axis 3 pitch control, respectively.

Thus, in some configurations of the present invention, motor drives for one or more (for example, three) pitch motors can comprise MOSFETs or IGBTs. Non-regenerative sources are provided in some configurations for one or more pitch motors, whereas in other configurations regenerative sources comprising MOSFETs or IGBTs are provided. In some configurations, a single source (for example, a regenerative source) is provided for a plurality of pitch motors (e.g., three pitch motors), whereas in some configurations, an individual source (for example, a regenerative source) is provided for each individual pitch motor.

The use of pitch control drive systems with a DC link as an intermediate link between source and load requires, in some configurations, that the DC link absorb regenerative energy under some conditions, such as when the motors are decelerating when the DC link(s) are supplied by a diode source. As can now be appreciated from the example configurations discussed herein, configurations of the present invention advantageously absorb this energy using capacitors and/or switched resistors on the DC link, and/or by using a fully regenerative active source of DC voltage.

While the invention has been described in terms of various specific embodiments, those skilled in the art will recognize that the invention can be practiced with modification within the spirit and scope of the claims.

What is claimed is:

1. A method for powering a pitch motor drive system for at least one DC pitch motor of a wind turbine, said method comprising rectifying a voltage using a bridge circuit to thereby supply a DC link voltage to a bridge comprising active switching devices, and utilizing at least one link capacitor to smooth the DC link voltage and act as an energy sink and source for the at least one DC pitch motor.

2. A method in accordance with claim 1 further comprising utilizing at least one dynamic brake resistor to dissipate regenerative energy from the at least one DC pitch motor and utilizing a plurality of link capacitors to smooth the DC link voltage and act as an energy sink and source of the at least one DC pitch motor.

3. A method in accordance with claim 1 wherein the wind turbine comprises a plurality of DC pitch motors each driven by a separate pitch motor drive system, and said method further comprises sharing the DC link voltage between a plurality of pitch motor drive systems.

4. A method in accordance with claim 3 further comprising dissipating energy from the pitch motor drive systems utilizing separate dynamic brake resistors for each pitch motor drive system.

5. A method in accordance with claim 3 further comprising dissipating energy from all the pitch motor drive systems utilizing a common dynamic brake resistor.

6. A method in accordance with claim 5 further comprising absorbing substantially all regenerative energy not circulated between the pitch motor drive systems.

7. A system for supplying power to at least one DC pitch motor of a wind turbine, said system comprising a bridge circuit coupled to a source of power and configured to produce a rectified DC link voltage, a bridge of active switching devices configured to switch the DC link voltage and supply the switched DC link voltage to the at least one DC pitch motor, and at least one link capacitor in circuit and configured to smooth the DC link voltage and act as an energy sink and source for the at least one DC pitch motor.

8. A system in accordance with claim 7 further comprising at least one dynamic brake resistor in circuit and configured to dissipate regenerative energy from the pitch motor drive system.

9. A system in accordance with claim 8 comprising a plurality of said link capacitors in circuit and configured to smooth the DC link voltage and act as an energy sink and source for the pitch motor drive system.

10. A system in accordance with claim 9 wherein said plurality of link capacitors configured to keep the DC link voltage within predefined limits.

11. A system in accordance with claim 7 having a plurality of DC pitch motors driven by separate pitch motor drive systems, and said system configured to share the DC link voltage between said plurality of pitch motor drive systems.

12. A system in accordance with claim 11 further comprising separate dynamic brake resistors for each pitch motor drive systems, said separate dynamic brake resistors configured to dissipate energy from their respective pitch motor drive systems.

13. A system in accordance with claim 11 further comprising dissipating energy from all the pitch motor drive systems utilizing a common dynamic brake resistor.

14. A system in accordance with claim 13 further configured to absorb substantially all regenerative energy not circulated between the pitch motor drive systems and to regulate the DC link voltage and apply the regulated DC link voltage to all of the pitch motor drive systems.

15. A system in accordance with claim 11 having three DC pitch motors and a single regenerative source.

16. A wind turbine comprising a rotor having at least one blade operatively coupled to at least one DC pitch motor, and a power system comprising a bridge circuit operatively coupled to a source of power and configured to produce a rectified DC link voltage, a bridge of active switching devices configured to switch the DC link voltage and supply the switched DC link voltage to the at least one DC pitch motor, and at least one link capacitor in circuit and configured to smooth the DC link voltage and act as an energy sink and source.

17. A wind turbine in accordance with claim 16 wherein said power system further comprises at least one dynamic brake resistor configured to dissipate regenerative energy.

18. A wind turbine in accordance with claim 16 wherein said power system further comprises a plurality of said link capacitors configured to smooth the DC link voltage and act as an energy sink and source.

19. A wind turbine in accordance with claim 16 having a plurality of said blades each operatively coupled to one of a plurality of DC pitch motors driven by separate pitch motor drive systems that are configured to share the DC link voltage between said plurality of DC pitch motors.

20. A wind turbine in accordance with claim 16 having three DC pitch motors and a single regenerative source.

* * * * *